3,499,806
DODECAHYDRO-2,5-BENZODIAZOCINES
Theodore S. Sulkowski, Narberth, Pa., assignor to American Home Products Corporation, New York, N.Y., a corporation of Delaware
No Drawing. Filed May 12, 1967, Ser. No. 637,928
Int. Cl. C07d 53/00
U.S. Cl. 260—239                 8 Claims

ABSTRACT OF THE DISCLOSURE

This invention is concerned with dodecahydrobenzodiazocines which are pharmacologically active as anorexiants. Further, this invention is concerned with the process for preparing these dodecahydrobenzodiazocines by the hydrogenation of the corresponding hexahydrobenzodiazocines with hydrogen under pressure in the presence of a platinum oxide catalyst.

---

The present invention relates to new and novel dodecahydrobenzodiazocine compounds as well as to the process for their preparation. In particular, the present invention is concerned with dodecahydrobenzodiazocines which are therapeutically efficacious as anorexiants.

The compounds which are included within the purview of the present invention are represented by the following formula:

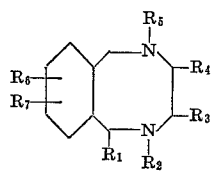

wherein $R_1$ is selected from the group consisting of lower alkyl, phenyl, lower alkylphenyl, lower alkoxyphenyl, di(lower)alkylphenyl, di(lower)alkoxyphenyl, aminophenyl, phen(lower)alkyl, furyl, thienyl and naphthyl; $R_2$ and $R_5$ are both selected from the group consisting of hydrogen, lower alkyl and phen(lower)alkyl; $R_3$ and $R_4$ are both selected from the group consisting of hydrogen and lower alkyl; $R_6$ and $R_7$ are both selected from the group consisting of hydrogen, amino, lower alkyl, and lower alkoxy; and the pharmaceutically acceptable acid addition salts thereof. Typical examples thereof are: dodecahydro-1-phenyl-2,5-benzodiazocine hydrochloride; dodecahydro-1-(p-methoxyphenyl)-2,5 - benzodiazocine hydrochloride; dodecahydro-8,9-dimethyl-1-phenyl - 2,5 - benzodiazocine; 2,5-diethyldodecahydro-1-phenyl-2,5-benzodiazocine; and dodecahydro-3,4-dimethyl-1-phenyl-2,5-benzodiazocine.

The new and novel dodecahydrobenzodiazocines of the present invention are prepared by the process of this invention which is schematically illustrated as follows:

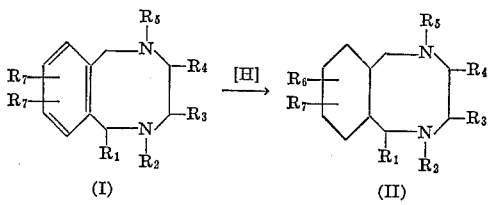

wherein $R_1$, $R_2$, $R_3$, $R_4$, $R_5$, $R_6$ and $R_7$ are defined as above. The reaction is effected by contacting an appropriate hexahydrobenzodiazocine (I) with hydrogen under pressure (from about 20 p.s.i. to about 75 p.s.i.), in the presence of a platinum oxide catalyst, in a reaction-inert acid solvent. Preferably, this reaction is conducted in glacial acetic acid under a hydrogen pressure of about 45 p.s.i.

When the hydrogenation reaction is complete, the catalyst is removed by filtration and the filtrate containing the product is evaporated to dryness. Thereafter, the dodecahydrobenzodiazocine (II) is obtained by standard recovery procedures, such as, the residue is slurried with ethyl acetate, filtered and recrystallized from a suitable solvent, e.g., alkanol-acetone, alkanol-ether and alkanol-ethyl acetate mixtures.

The hexahydrobenzodiazocine compounds (I) which are used as starting materials in the process of the present invention are known compounds which are prepared and described in copending U.S. patent application, Ser. No. 609,779, filed on Jan. 17, 1967, and entitled "Benzodiazocines" which is a continuation-in-part of U.S. patent application, Ser. No. 554,672, filed on June 2, 1966, also entitled "Benzodiazocines." By reaction-inert, acidic solvent as employed herein is meant any acidified solvent or acid which will dissolve the hexahydrobenzodiazocine and not interfere with the hydrogenation thereof. Many such solvents will readily suggest themselves to one skilled in the art of chemistry, for example, glacial acetic acid, alkanol-hydrochloric acid mixtures and alkanol-hydrobromic acid mixtures.

In accord with the present invention, the new dodecahydrobenzodiazocines herein described have been found to possess interesting pharmaceutical properties which render them useful as synthetic medicinals. More particularly, these compounds, in standard pharmacological tests have exhibited utility as anoretic agents.

When the compounds of this invention are employed as anorexiants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 15 mg. to about 150 mg. per day, although as aforementioned variations will occur. However, a dosage level that is in the range of from about 45 mg. to about 90 mg. per day is most desirably employed in order to achieve effective results.

The following examples are given by way of illustration and are not to be construed as limitations of this invention, variations of which are possible without departing from the scope and spirit thereof.

Example I

Fifteen grams of 1,2,3,4,5,6-hexahydro-1-phenyl-2,5-benzodiazocine dihydrochloride, 3 g. of platinum oxide and 150 ml. of glacial acetic acid are shaken with hydrogen at an initial pressure of 43 p.s.i. Hydrogen uptake is completed after nineteen hours. Thereafter, the catalyst is separated by filtration and the filtrate is evaporated to dryness in vacuo. The solid residue is slurried with ethyl acetate and filtered. On recrystallization from aqueous alcohol-acetone mixture, there is obtained dodecahydro-1-phenyl-2,5-benzodiazocine dihydrochloride, M.P. 322° C. (dec.).

Analysis.—Calcd. for $C_{16}H_{24}N_2 \cdot 2HCl$ (percent): C, 60.56; H, 8.26; N, 8.83; Cl, 22.35. Found (percent): C, 60.84; H, 8.08; N, 9.25; Cl, 22.1.

Example II

Thirty grams of 1,2,3,4,5,6-hexahydro-1-(p-methoxyphenyl)-2,5-benzodiazocine dihydrochloride, 6.0 g. of platinum oxide and 300 ml. of an ethanolic-hydrochloric acid mixture are shaken with hydrogen at an initial pressure of 75 p.s.i. When hydrogen uptake is complete, the catalyst is separated by filtration and the filtrate is evaporated to dryness in vacuo. The solid residue is slurried with ethyl acetate and filtered. On recrystallization from aqueous alcohol-ethyl acetate mixture, there is obtained dodecahydro-1-(p-methoxyphenyl) - 2,5 - benzodiazocine dihydrochloride.

In a similar manner, 1,2,3,4,5,6-hexahydro-1-(p-methoxyphenyl)-2-methyl - 2,5 - benzodiazocine is hydrogenated to afford dodecahydro-1-(p-methoxyphenyl)-2-methyl-2,5-benzodiazocine.

Example III

Repeating the procedure of Examples I and II, to hydrogenate an appropriate hexahydrobenzodiazocine, the following products are obtained:

dodecahydro-3,4-dimethyl-1-phenyl-2,5-benzodiazocine;
1-benzyl-dodecahydro-2,5-benzodiazocine dihydrochloride;
dodecahydro-1-(2-thienyl)-2,5-benzodiazocine;
dodecahydro-1-(3-thienyl)-2,5-benzodiazocine;
1-(3-furyl)-dodecahydro-2,5-benzodiazocine;
dodecahydro-8-methyl-1-phenyl-2,5-benzodiazocine;
9-amino-dodecahydro-1-phenyl-2,5-benzodiazocine; and
dodecahydro-8,9-dimethoxy-1-(p-tolyl)-2,5-benzodiazocine.

Example IV

Fifteen grams of 1,2,3,4,5,6-hexahydro-8,9-dimethyl-1-phenyl-2,5-benzodiazocine, 3.0 g. of platinum oxide and 150 ml. of glacial acetic acid are shaken with hydrogen at an initial pressure of 25 p.s.i. When hydrogen uptake is complete, the catalyst is separated by filtration and the filtrate is evaporated to dryness in vacuo. The solid residue is slurried with ethyl acetate and filtered. On recrystallization from aqueous alcohol-acetone mixture, there is obtained dodecahydro - 8,9-dimethyl-1-phenyl-2,5-benzodiazocine.

Similarly, 1-ethyl-1,2,3,4,5,6-hexahydro-3,4-dimethyl-2,5-benzodiazocine is hydrogenated to afford 1-ethyl-dodecahydro-3,4-dimethyl-2,5-benzodiazocine.

Example V

Eight grams of 1,2,3,4,5,6-hexahydro-8-methyl-1-(p-tolyl)-2,5-benzodiazocine, 1.5 g. of platinum oxide and 75 ml. of glacial acetic acid are shaken with hydrogen at an initial pressure of 45 p.s.i. When hydrogen uptake is complete, the catalyst is separated by filtration and the filtrate is evaporated to dryness in vacuo. The solid residue is slurried with ethyl acetate and filtered. On recrystallization from aqueous alcohol-ether mixture, there is obtained dodecahydro - 8 - methyl-1-(p-tolyl)-2,5-benzodiazocine.

In the same manner, 1,2,3,4,5,6-hexahydro-3,4-dimethyl-1-(2-thienyl)2,5-benzodiazocine and 1-(m-aminophenyl)-1,2,3,4,5,6-hexahydro-2,5-benzodiazocine are respectively converted to dodecahydro-3,4-dimethyl-1-(2-thienyl)-2,5-benzodiazocine and 1-(m-aminophenyl)-dodecahydro-2,5-benzodiazocine.

Example VI

When the hydrogenation procedure of the previous examples is repeated on the following hexahydrobenzodiazocines the hereinafter listed dodecahydrobenzodiazocines are obtained:

| Hexahydrobenzodiazocines | Dodecahydrobenzodiazines |
|---|---|
| 1,2,3,4,5,6-hexahydro-1-(2,4-dimethoxyphenyl)-2,5-benzodiazocine. | Dodecahydro-1-(2,4-dimethoxyphenyl)-2,5-benzodiazocine. |
| 1,2,3,4,5,6-hexahydro-1-(5,6,7,8-tetrahydro-2-naphthyl)-2,5-benzodiazocine. | Dodecahydro-1-(5,6,7,8-tetrahydro-2-naphthyl)-2,5-benzodiazocine. |
| 1,2,3,4,5,6-hexahydro-4-methyl-1-phenyl-2,5-benzodiazocine. | Dodecahydro-4-methyl-1-phenyl-2,5-benzodiazocine. |
| 1,2,3,4,5,6-hexahydro-3-methyl-1-phenyl-2,5-benzodiazocine. | Dodecahydro-3-methyl-1-phenyl-2,5-benzodiazocine. |
| 1-(p-ethylphenyl)-1,2,3,4,5,6-hexahydro-2,5-benzodiazocine hydrochloride. | 1-(p-ethylphenyl)-dodecahydro-2,5-benzodiazocine hydrochloride. |
| 3-ethyl-1,2,3,4,5,6-hexahydro-1-phenyl-2,5-benzodiazocine. | 3-ethyl-dodecahydro-1-phenyl-2,5-benzodiazocine. |
| 4-ethyl-1,2,3,4,5,6-hexahydro-1-(p-tolyl)-2,5-benzodiazocine. | 4-ethyl-dodecahydro-1-(p-tolyl)-2,5-benzodiazocine. |

Example VII

Fifteen grams of 2,5-diethyl-1,2,3,4,5,6-hexahydro-1-phenyl-2,5-benzodiazocine, 3.0 g. of platinum oxide and 150 ml. of glacial acetic acid are shaken with hydrogen at an initial pressure of 43 p.s.i. When hydrogen uptake is complete, the catalyst is separated by filtration and the filtrate is evaporated to dryness in vacuo. The solid residue is slurried with ethyl acetate and filtered. On recrystallization from aqueous alcohol-acetone mixture, there is obtained 2,5 - diethyl-dodecahydro-1-phenyl-2,5-benzodiazocine.

In a similar manner, 1,2,3,4,5,6-hexahydro-2,5-dimethyl-1-phenyl-2,5-benzodiazocine and 1,2,3,4,5,6-hexahydro-2,5 - dipropyl - 1 - (2-thienyl)-2,5-benzodiazocine are respectively converted to dodecahydro-2,5-dimethyl-1-phenyl-2,5-benzodiazocine and dodecahydro - 2,5 - dipropyl-1-(2-thienyl)-2,5-benzodiazocine.

Example VIII

When the hydrogenation procedure of Examples V–VII is repeated employing the following hexahydrobenzodiazocines as starting materials, the hereinafter listed dodecahydrobenzodiazocines are produced:

| Hexahydrobenzodiazocines | Dodecahydrobenzodiazocines |
|---|---|
| 1-(p-ethoxyphenyl)-1,2,3,4,5,6-hexahydro-2,5-benzodiazocine. | 1-(p-ethoxyphenyl)-dodecahydro-2,5-benzodiazocine. |
| 1,2,3,4,5,6-hexahydro-1,5-dimethyl-2,5-benzodiazocine. | Dodecahydro-1,5-dimethyl-2,5-benzodiazocine. |
| 2-ethyl-1,2,3,4,5,6-hexahydro-1-phenyl-2,5-benzodiazocine. | 2-ethyl-dodecahydro-1-phenyl-2,5-benzodiazocine. |
| 1,2,3,4,5,6-hexahydro-8,9-dimethyl-1-phenethyl-2,5-benzodiazocine. | Dodecahydro-8,9-dimethyl-1-phenethyl-2,5-benzodiazocine. |
| 2,5,8-triethyl-1,2,3,4,5,6-hexahydro-1-(p-tolyl)-2,5-benzodiazocine. | 2,5,8-triethyl-dodecahydro-1-(p-tolyl)-2,5-benzodiazocine. |
| 2,5-dibenzyl-1,2,3,4,5,6-hexahydro-1-phenyl-2,5-benzodiazocine. | 2,5-dibenzyl-dodecahydro-1-phenyl-2,5-benzodiazocine. |
| 5-benzyl-1,2,3,4,5,6-hexahydro-2-methyl-1-phenyl-2,5-benzodiazocine. | 5-benzyl-dodechaydro-2-methyl-1-phenyl-2,5-benzodiazocine. |
| 1,2,3,4,5,6-hexahydro-5-phenethyl-1-phenyl-2,5-benzodiazocine. | Dodecahydro-5-phenethyl-1-phenyl-2,5-benzodiazocine. |
| 1,2,3,4,5,6-hexahydro-1-(3,4-dimethylphenyl)-2,5-benzodiazocine. | Dodecahydro-1-(3,4-dimethylphenyl)-2,5-benzodiazocine. |

Example IX

Since the above prepared dodecahydrobenzodiazocines are basic, advantage may be taken of the water solubility of salts of these compounds formed with acids in the isolation and/or purification of the above compounds and in the preparation of aqueous solutions of these new compounds for oral or parenteral administration. Of course, only salts formed with pharmaecutically acceptable acids should be employed in therapeutic applications. Particularly effective salts are those formed with pharmaceutically acceptable acids having a pK value of 3 or lower. Such acids are well known in the art, for example, hydrochloric, hydrobromic, sulfuric, nitric, phosphoric, benzenesulfonic, toluenesulfonic, methanesulfonic, ethanesulfonic acids and the like. These salts may be prepared by procedures commonly employed in the art, for example, reacting the compounds with an equivalent of the selected acid in aqueous solution and concentration of the solution. Other known procedures may also be employed.

What is claimed is:

1. A compound selected from the group consisting of those having the formula:

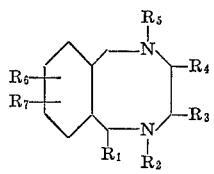

wherein $R_1$ is selected from the group consisting of lower alkyl, phenyl, lower alkylphenyl, lower alkoxyphenyl, di(lower)alkylphenyl, di(lower)alkoxyphenyl aminophenyl, phen(lower)alkyl, furyl, thienyl and naphthyl; $R_2$ and $R_5$ are both selected from the group consisting of hydrogen and lower alkyl; $R_6$ and $R_7$ are both selected from the group consisting of hydrogen, amino, lower alkyl, and lower alkoxy; and the pharmaceutically acceptable acid addition salts thereof.

2. A compound as described in claim 1 which is: dodecahydro-1-phenyl-2,5 - benzodiazocine dihydrochloride.

3. A compound as described in claim 1 which is: dodecahydro-1-(p-methoxyphenyl)-2,5-benzodiazocine dihydrochloride.

4. A compound as described in claim 1 which is: dodecahydro-8,9-dimethyl-1-phenyl-2,5-benzodiazocine.

5. A compound as described in claim 1 which is: dodecahydro-8-methyl-1-(p-tolyl)-2,5-benzodiazocine.

6. A compound as described in claim 1 which is: 2,5-diethyl-dodecahydro-1-phenyl-2,5-benzodiazocine.

7. A compound as described in claim 1 which is: dodecahydro-3,4-dimethyl-1-phenyl-2,5-benzodiazocine.

8. A compound as described in claim 1 which is: 1-benzyl-dodecahydro-2,5 - benzodiazocine dihydrochloride.

References Cited

Augustine: Catalytic Hydrogenation, New York, 1965, pp. 45, 106, and 116.

ALTON D. ROLLINS, Primary Examiner

U.S. Cl. X.R.

260—329, 332.3, 332.5, 347.2, 347.7; 424—244, 275, 285